United States Patent [19]
Oishi

[11] Patent Number: 4,644,549
[45] Date of Patent: Feb. 17, 1987

[54] GAS LASER DEVICE

[75] Inventor: Yuji Oishi, Kanagawa, Japan

[73] Assignee: Amada Company, Limited, Japan

[21] Appl. No.: 737,468

[22] Filed: May 24, 1985

[30] Foreign Application Priority Data
May 29, 1984 [JP] Japan .................................. 59-107574

[51] Int. Cl.$^4$ ................................................ H01S 3/00
[52] U.S. Cl. ........................................ 372/38; 372/29;
372/81; 372/87
[58] Field of Search ...................... 372/38, 55, 81, 29,
372/86, 87

[56] References Cited
U.S. PATENT DOCUMENTS
3,943,465  3/1976  Aisenberg et al. .................... 372/61

FOREIGN PATENT DOCUMENTS
0099785  6/1984  Japan ........................................ 378/87

Primary Examiner—Leon Scott, Jr.
Attorney, Agent, or Firm—Wigman & Cohen

[57] ABSTRACT

The present invention relates to a device in which a laser medium in a discharge space is excited by a discharge. The device includes a positive electrode and a plurality of negative electrodes in opposition, connected to a simmer power source and a main discharge power source. There is also a plurality of first stabilized resistances, which restrict the current of the simmer power source, each of which is respectively connected to one of the negative electrodes. There is also a plurality of first reverse current prevention elements, each of which is connected to the main discharge power source, and connected in parallel with one of the first stabilized resistances.

6 Claims, 3 Drawing Figures

GAS LASER DEVICE

BACKGROUND OF THE INVENTION

1. Field of the Invention

The present invention relates to a gas laser device, and more particularly to a discharge circuit for a gas laser device.

2. Description of the Present Art

A discharge circuit for a gas laser device, briefly described, usually comprises a positive electrode, connected to a source of DC power, opposing a plurality of negative electrodes, with a stabilized resistance connected in series with each negative electrode respectively. In a discharge circuit of this configuration there are no particular problems during continuous discharge. However, in order to carry out a pulse discharge, when a source of pulsed power is used in place of the previously mentioned source of DC power, the discharge is intermittent, so that the onset of the discharge current is delayed, causing the build up time to be extremely long. Accordingly, in the case where a rectangular waveform, for example, is used as an electric power pulse wave, the onset of the discharge current is considerably delayed and the wave form breaks down.

In order to reduce the delay in the onset of the above mentioned discharge current, conventionally, an extremely weak discharge of current at a level where laser generation does not occur, known as a simmer discharge, is always maintained between the positive and negative electrodes. The pulse voltage is accumulated in this status and the pulse discharge is carried out in the usual manner. In a circuit which performs this type of pulse discharge, a positive electrode is connected to both the simmer and pulse power sources and a plurality of negative electrodes are positioned in opposition. One of a plurality of stabilized resistances for simmer use is connected in series to each of the negative electrodes, and one of a plurality of stabilized resistances for pulse use, connected to the pulse power source, is connected in parallel to each. The stabilized resistance for simmer use is put at a value of several times that of the abovementioned stabilized resistance for pulse use, to make the simmer current sufficiently smaller than the pulse current.

In a conventional circuit with a configuration such as outlined above, the simmer power and pulse power, when OFF, have a rather high internal impedance. The pulse power is maintained in OFF status and the simmer power is turned ON first. The voltage of the simmer power increases, and when it exceeds the initial discharge voltage between the positive and negative electrodes, discharge commences between the positive electrode and one suitable negative electrode. when this discharge commences, current flows between the positive electrode and that one suitable negative electrode, and the voltage between the positive electrode and that one suitable negative electrode becomes the discharge support voltage, which has dropped from the initial value by the product of the stabilized simmer resistance and the amperage. This discharge support voltage is considerably lower than the initial discharge voltage.

In this manner, the current which flows from the positive electrode and that one suitable negative electrode passes through the stabilized simmer resistance connected to that one negative electrode. It then passes through the parallel circuits of the stabilized pulse resistances and the stabilized simmer resistances connected to the other negative electrodes from the parallel stabilized pulse resistances and returns to the simmer power source. In this case, the voltage between the positive electrode and those other negative electrodes is just slightly higher than the voltage between the positive electrode and that one negative electrode, and is considerably lower than the initial discharge voltage. Accordingly, in order that discharge will take place between the positive electrode and those other negative electrodes, a large voltage is necessary, with the result that a large current is necessary.

Because of this, the voltage of the simmer power source must be extremely high in order to cause a discharge between the positive electrode and those other negative electrodes, after the discharge takes place between the positive electrode and that one negative electrode. Specifically, a high voltage and large amperage is required at the simmer power source, and a large current flows between the positive electrode and that one negative electrode during the interval up to the commencement of discharge between the positive electrode and those other negative electrodes. Accordingly, a large amperage is necessary to obtain a discharge between the positive electrode and all the negative electrodes.

However, in actual fact, because an extremely small amperage at a level where laser generation does not occur flows at the simmer discharge, the simmer discharge is produced between a number of the negative electrodes and only one portion of the positive electrode. Accordingly, when the pulse voltage is applied, it is applied simultaneously between the electrodes in which the simmer discharge is taking place as well as the electrodes in which the simmer discharge is not taking place. In the case where the pulse voltage is applied between the electrodes in which the simmer discharge is taking place, the build-up time of the discharge current is small so that the variation between each pulse is also small. However, in the electrodes in which the simmer discharge is not taking place, the build-up time of the discharge current is large so that the variation between each pulse is also large.

Accordingly, in a conventional circuit in which the simmer discharge is produced between the positive electrode and one part of the negative electrodes only, not between the positive electrode and all the negative electrodes, the pulse build-up time becomes large for all pulse discharge currents which are the accumulated discharge current pulses between the positive electrode and each negative electrode, respective to the waveform of the applied pulse voltage. Furthermore, the pulse waveform is broken down. With a pulse waveform in which the discharge current is broken down in this way, the pulse output waveform of the laser beam is also broken down, and, in addition, there is an obstacle in increasing the pulse frequency.

SUMMARY OF THE INVENTION

An object of the present invention is to provide, with due consideration to the drawbacks of such conventional gas laser devices, a solution to the abovementioned problems by the provision of a gas laser device in which the pulse laser is generated with little breakdown of the pulse waveform.

A second object of the present invention is to provide a gas laser device in which the voltage of the simmer power source can be smaller than the initial discharge voltage, and the amount of current can be small.

Briefly described, this and other objects of the present invention are accomplished by the provision of a gas laser device comprising a positive electrode connected to both a simmer power source and a main discharge power source, a plurality of negative electrodes opposite the positive electrode, a plurality of first stabilized resistances which limit the amperage of the simmer power source and are connected to each of the negative electrodes; a plurality of second stabilized resistances which limit the amperage of the main discharge power source and are connected in parallel with each of the first stabilized resistances, and a plurality of reverse current prevention elements connected in series with the second stabilized resistances. In this way, because of the configuration in which a reverse current prevention element is connected in series with each of the second stabilized resistances, when, for example, a simmer discharge is generated between the positive electrode and one suitable negative electrode, there is no current flowing in the reverse direction in the second stabilized resistances connected to the other adjacent negative electrodes, so that there is no effect on the initial discharge between the positive electrode and those other negative electrodes.

BRIEF DESCRIPTION OF THE DRAWINGS

These and other objects, features and advantages of the present invention will become more apparent from the following description of a preferred embodiment taken in conjunction with the accompanying drawings, in which.

DESCRIPTION OF THE PREFERRED EMBODIMENT

Following is a description of the preferred embodiment of the present invention, with reference to the drawings.

Figure 1:
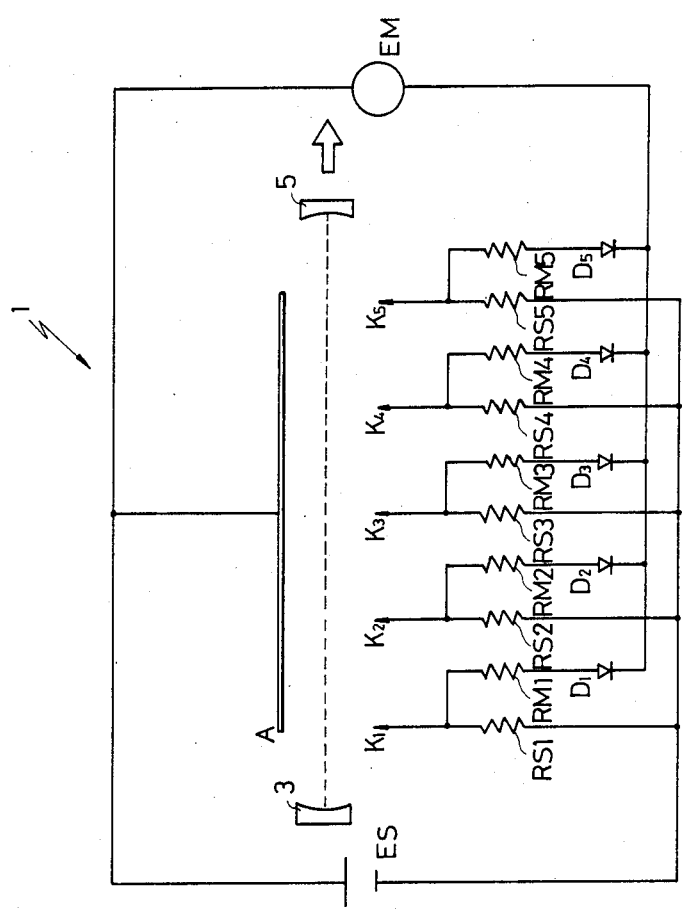
FIG. 1 is a schematic explanatory drawing showing a first embodiment of the present invention.

Now referring to FIG. 1, a gas laser device 1 is provided with a positive electrode A in opposition to a plurality of negative electrodes K1 to K5, and is also provided with a total reflecting mirror 3 and a reflecting mirror 5. In addition, although not shown because a detailed representation of the gas laser device 1 has been omitted from the drawing, a laser gas feed device which feeds a laser gas from a mixture of gases such as, for example, $CO_2$, $N_2$, He, and the like, between the positive electrode A and the negative electrodes $K_1$ to $K_5$, and a laser gas recycling device are also provided.

The positive electrode A and the negative electrodes $K_1$ to $K_5$ are connected, respectively, to a simmer power source ES and a main discharge power source EM. More specifically, each of the negative electrodes $K_1$ to $K_5$ is connected in series to the simmer power source ES through one of the first stabilized resistances RS1 to RS5 respectively. In addition, each of the negative electrodes $K_1$ to $K_5$ is connected to the main discharge power source EM through one of the second stabilized resistances RM1 to RM5, which are connected in parallel to the first resistances RS1 to RS5.

Furthermore, one element respectively of a plurlity of reverse current prevention elements $D_1$ to $D_5$, which could be, for example, diodes, is connected in series with each of the second stabilized resistances RM1 to RM5. In this embodiment of the present invention, the reverse current prevention elements $D_1$ to $D_5$ are represented as diodes. However, this is in no way restrictive, and other types of elements such as, for example, transistors, can also be used.

In the above type of configuration, a simmer discharge is produced between the positive electrode A and a suitable negative electrode, for example $K_1$, and when a simmer discharge is not produced between the positive electrode A and the other negative electrodes $K_2$ to $K_5$, the current which flows from the positive electrode A to the negative electrode $K_1$ passes through the first stabilized resistance RS1 and returns to the simmer power source ES. At that time, one part of the current passes through the second stabilized resistance RM1 and the reverse current prevention element D1, and has a tendency to flow through the other second stabilized resistances RM2 to RM5. However, because one of the reverse current prevention elements D2 to D5 is respectively connected to each of the second stabilized resistances RM2 to RM5, the current does not flow in these second stabilized resistances RM2 to RM5.

Accordingly, even in the case where a simmer discharge is produced between the positive electrode A and a suitable negative electrode, for example $K_1$, the voltage between the positive electrode A and the other second stabilized resistances RM2 to RM5 is maintained at the voltage of the simmer power source ES. Thus, the voltage of the simmer power source ES is adequate as the discharge initial voltage to initiate a simmer discharge, and the current capacity of the simmer power source can be small.

Figure 2:
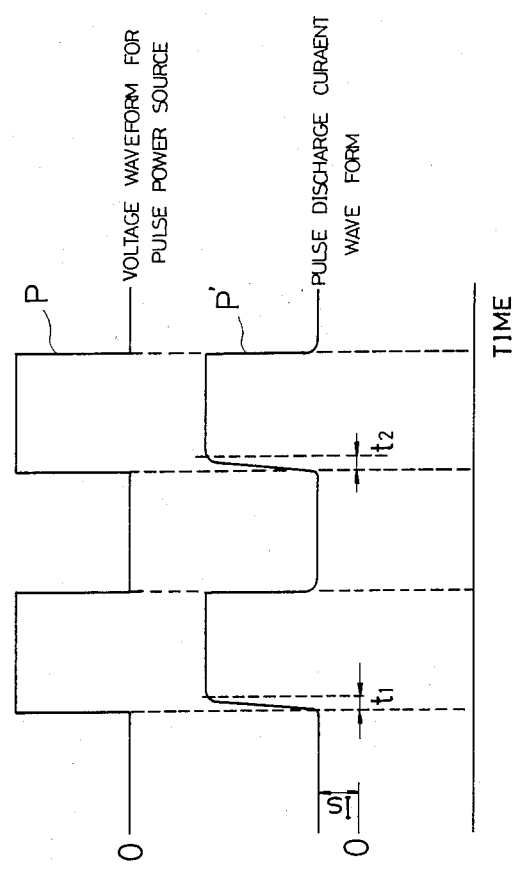
FIG. 2 is an explanatory drawing showing the correct pulse discharge current waveform for the voltage waveform of the pulse power source.

Specifically, even with a minute degree of electric current at a level where laser generation does not occur, a simmer discharge is possible between the positive electrode A and each of the negative electrodes $K_1$ to $K_5$. Accordingly, when using the main discharge power source EM for a pulse power source, a pulse voltage is loaded between the positive electrode A and the negative electrodes $K_1$ to $K_5$, as shown in FIG. 2, and the pulse build-up time $t_1$, $t_2$ of the pulse discharge current waveform P' is extremely small respective to the voltage waveform P of the pulse power source, and is a precise pulse waveform. In this way, because of the fact that the pulse discharge current waveform P' is a precise pulse waveform, the output waveform of the laser beam also becomes a precise waveform, and, in addition, the pulse frequency can be high.

Figure 3:
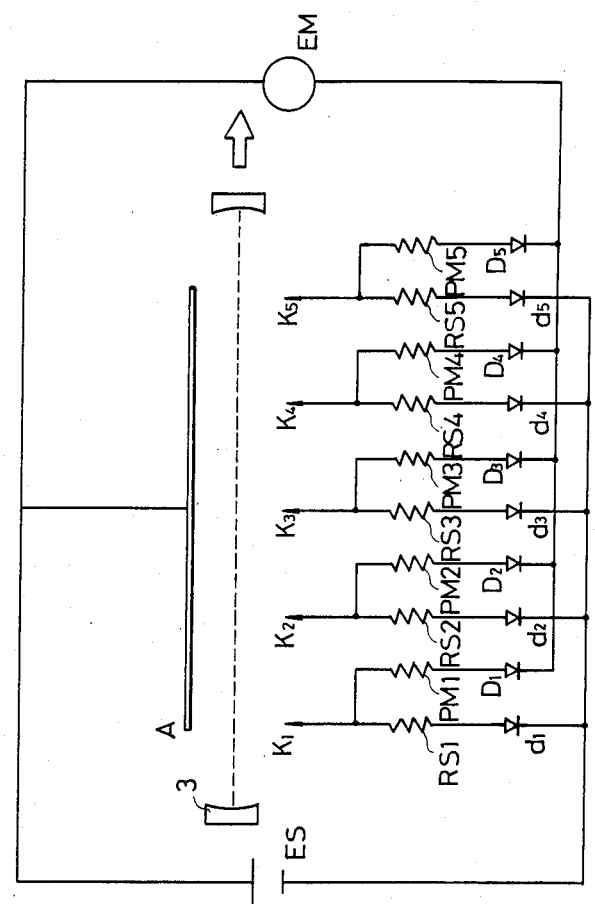
FIG. 3 is a schematic explanatory drawing showing a second embodiment of the present invention.

FIG. 3 shows a second embodiment of the present invention. This embodiment differs from the embodiment illustrated in FIG. 1 inasmuch as each of the first stabilized resistances RS1 to RS5 has a reverse current prevention factor, respectively $D_2$ to $D_5$, connected in series. The balance of this configuration is identical to that of the first embodiment. The action and results of this second embodiment are the same as that of the first embodiment, and, in addition, the discharge from the main discharge power source EM is more stabilized.

As can be understood from the above explanation of the embodiments, by means of the present invention, the voltage of the simmer power source can be lower than the initial discharge voltage and the amount of current can be small. In addition, when a pulse power source is used as the main discharge power source, a precise pulse waveform with extremely small breakdown of the pulse discharge current waveform is possible, and it is possible to obtain a laser beam output waveform as a precise pulse waveform.

Furthermore, the present invention is not limited to the embodiments which have been described in way of explanation. A wide variety of modifications is possible, and the present invention can be implemented in other modes. For example, the first stabilized resistances and the second stabilized resistances can be connected in series, or a third set of stabilized resistances can be connected in addition to the negative electrodes, etc.

What is claimed is:

1. A gas laser device, in which a laser medium in a discharge space, is excited by means of a discharge, comprising:
   a positive electrode and a plurality of negative electrodes in opposition, connected to a simmer power source and a main discharge power source;
   a plurality of first stabilized resistances, which restrict the current of the simmer power source, each of which is connected to one of the negative electrodes; and
   a plurality of first reverse current prevention elements, each of which is connected to the main discharge power source and connected in parallel with one of the first stabilized resistances.

2. The gas laser device of claim 1 further comprising:
   a plurality of second stabilized resistances which limit the current of the main discharge power, each of which is connected in parallel with the one of the first stabilized resistances; said reverse current prevention elements, being connected in series with the second stabilized resistances.

3. The gas laser device of claim 1, wherein a plurality of second reverse current prevention elements are connected in series with the first stabilized resistances.

4. A gas laser device, comprising:
   a positive electrode mounted in a discharge space and connected to a simmer power source and a main discharge power source;
   a plurality of negative electrodes opposite the positive electrode and connected to the simmer power source and the main discharge power source;
   a plurality of first stabilized resistance means, each of which is connected in series between the simmer power source and one of the negative electrodes for restricting the current of the simmer power source;
   a plurality of second stabilized resistance means, each of which is connected in series between the main discharge power source and one of the negative electrodes for restricting the current of the main power source; and
   a plurality of first reverse current prevention devices, each of which is connected in series between the main discharge power source and a respective second stabilized resistance means.

5. The gas laser device according to claim 4, further comprising a plurality of second reverse current prevention devices, each of which is connected in series between the simmer power source and a respective first stabilized resistance means.

6. The gas laser device according to claim 4, wherein the first and second stabilized resistance means are connected in parallel with each other.

* * * * *